United States Patent [19]
Arai et al.

[11] Patent Number: 5,115,319
[45] Date of Patent: May 19, 1992

[54] AUTOMATIC EXPOSURE CONTROL APPARATUS AND METHOD FOR ELECTRONIC STILL CAMERA

[75] Inventors: Fumihito Arai; Yoshihiko Mori, both of Tokyo, Japan

[73] Assignee: Fuji Photo Film Co., Ltd., Kanagawa, Japan

[21] Appl. No.: 623,531

[22] Filed: Dec. 7, 1990

[30] Foreign Application Priority Data

Dec. 8, 1989 [JP] Japan .................................. 1-319668

[51] Int. Cl.⁵ ...................... H04N 5/238; H04N 3/14; H04N 5/335
[52] U.S. Cl. ................................. 358/228; 358/213.19
[58] Field of Search ............ 358/228, 909, 209, 213.19

[56] References Cited

U.S. PATENT DOCUMENTS 4,910,600  3/1990  Kondo ................................. 358/228
4,984,088  1/1991  Tani et al. ........................... 358/228

FOREIGN PATENT DOCUMENTS 63-169180  7/1988  Japan .

Primary Examiner—Howard W. Britton
Assistant Examiner—Wendy R. Greening

[57] ABSTRACT

A pre-measurement of the subject brightness is performed with a preset aperture value and a preset shutter speed, and a main measurement is performed with a combination of an aperture value and a shutter speed that are determined based on the result of the pre-measurement in accordance with a program for the main measurement, wherein the aperture value is selected from among a relatively small number of predetermined aperture values. Thereafter, a combination of an aperture value and a shutter speed for photographing is determined based on the result of the main measurement in accordance with another program, wherein the aperture value is selected among a larger number of predetermined aperture values, so that the number of changing aperture value and thus the time lag are remarkably reduced while achieving an accurate exposure control.

15 Claims, 8 Drawing Sheets

AUTOMATIC EXPOSURE CONTROL APPARATUS AND METHOD FOR ELECTRONIC STILL CAMERA

BACKGROUND OF THE INVENTION

The present invention relates to a method of automatic exposure control for an electronic still camera and an apparatus therefor.

Electronic still cameras have been provided that photograph an image and record the image in a still video floppy disc instead of on a silver salt photographic film. In such an electronic still camera, image signals are picked up though a solid state imaging device such as an interline transfer CCD (charge coupled device) image sensor, which will be hereinafter referred to as a CCD. In order to determine the exposure value, a photosensor such as a SPD (silicon photo diode) has generally been used, but it is also known, for example from Japanese Unexamined Patent Publication 63-169180, to calculate the exposure value based on charges output from a CCD.

However, the dynamic range of a CCD, that is, the brightness range detectable by a CCD is about 8 EV (exposure value) that is narrower than that of a SPD, e.g. about 21 EV, which supposes that the film speed is ISO 100. Therefore, in view of the fact that the subject brightness variation is generally about 5 EV but may sometimes exceed such an ordinal level, the narrower dynamic range of the CCD will sometimes cause an erroneous measurement.

So as to avoid the erroneous measurement, a conventional electronic still camera measures again the subject brightness after adjusting aperture size and shutter speed to an exposure value determined by a calculation based on a first brightness value that has been measured immediately after the shutter release operation, calculates a new exposure value based on the secondly measured brightness value and compares it with the first exposure value so as again to adjust aperture size and shutter speed to the new exposure value. This procedure is repeated until an optimum combination of an aperture size and a shutter speed is determined.

This method is disadvantageous in that, since it takes a relatively long amount of time especially to adjust the aperture size, the time lag from the shutter release operation to the practical start of exposure becomes larger. As a result, an miss an optimum shutter chance.

SUMMARY OF THE INVENTION

In view of the foregoing, the object of the present invention is to provide an automatic exposure control method for an electronic still camera, by which an accurate exposure control is achieved though the time lag of shutter release is s short as to catch an optimum shutter chance.

To achieve the above object, the present invention suggests executing a preliminary measurement of the subject brightness (hereinafter called simply a pre-measurement) with a preset aperture value and a preset shutter speed, and thereafter to execute a main measurement with a combination of a aperture value and a shutter speed that are determined based on the result of the pre-measurement in accordance with a program for the main measurement, wherein the aperture value is selected from among a relatively small number of predetermined aperture values. Then, a combination of an aperture value and a shutter speed for photographing an image is determined based on the result of the main measurement in accordance with another program, wherein the aperture value is selected from among a larger number of predetermined aperture values.

Consequently, an accurate exposure control is achieved while the number of change of the aperture is remarkably reduced, which minimizes the time lag.

BRIEF DESCRIPTION OF THE DRAWINGS

Other objects and advantages of the invention will become apparent from the following detailed description when read in conjunction with the accompanying drawings in which like parts and elements are designated by the same reference numerals throughout several view of the drawings, wherein.

DETAILED DESCRIPTION OF THE INVENTION

Figure 1:
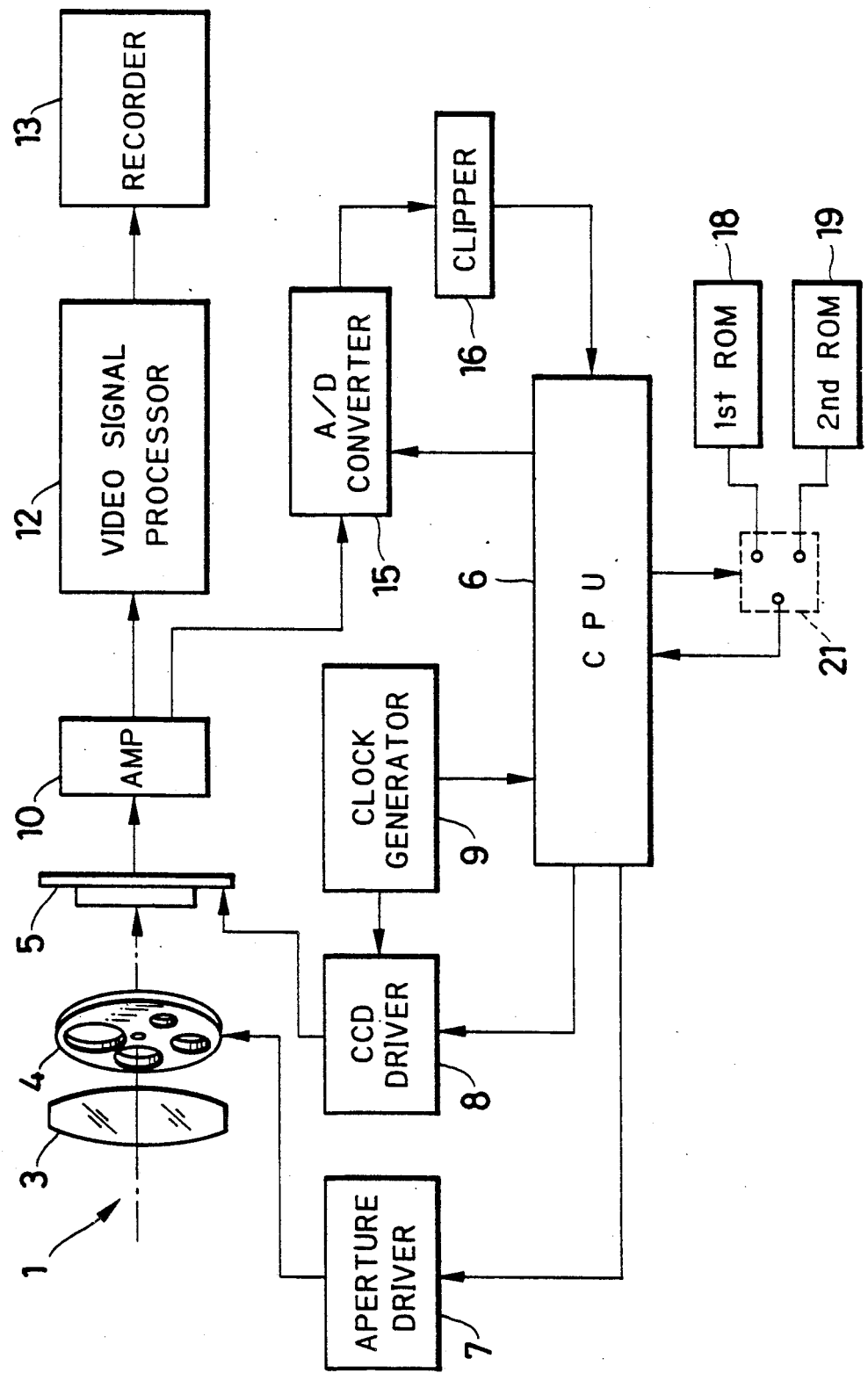
FIG. 1 is a block diagram of an automatic exposure control apparatus for an electronic still camera according to a first embodiment of the invention.

FIG. 1 illustrates circuitry of an electronic still camera 1 adopting an automatic exposure control apparatus according to an embodiment the present invention. Behind a taking lens 3, there is disposed an aperture disc 4 formed with a plurality of apertures of different sizes, e.g. four apertures sized f4, f5.6, f8, and f11 disposed around a rotational axis of the disc. Light passing through the taking lens 3 and one of the apertures of the aperture disc 4 forms an optical image on a solid state imaging device such as a CCD 5, which then photoelectrically converts the image into electric signals. The electric signals are processed as image signal on one hand, or used to measure an average brightness of a subject. The aperture disc 4 is connected to an aperture driver 7 which drives the aperture disc 4 to select one of the four apertures in accordance with a command signal from a CPU 6. The CPU 6 controls overall operation of the still camera 1.

It is to be noted that the aperture disc 4 is preferable because it is simple in construction and is accurate and stable in operation though it may be possible to substitute another aperture member for the aperture disc 4.

The CCD 5 is connected to a CCD driver 8 which controls the charge storage time of the CCD 5, that is, the shutter speed continuously to change within a range from 1/15 sec. to 1/1000 sec. in accordance with a command signal from the CPU 6. The CCD driver 8 is connected to a clock generator 9 for generating clock pulses. The clock pulses are supplied also to the CPU 6 so as to synchronize the CCD driver 8 with the CPU 6. The CCD 5 is connected also to an amplifier 10 which samples and holds the image signal from the CCD 5 at a predetermined sampling frequency, e.g. 3.58 MHz, and thereafter amplifies it.

The amplifier 10 is connected to a video signal processor 12 where the image signal is processed into a NTSC (national television system committee) television signal which includes a luminance signal, color signals, synchronizing signals and so forth. The video signal processor 12 transmit the television signal to a recorder 13 for writing them in a recording medium such as a magnetic floppy disc or an IC memory. The amplifier 10 also is connected to a clipper 16 though an A/D converter 15. The luminance signal output from the amplifier 10 is supplied to the clipper 16 where it is clipped off above a high luminance level, IRE (Institute of Radio Engineers) scale 100 for instance, as well as below a low luminance level, IRE 31 for instance.

The CPU 6 is connected either to a first ROM 18 or a second ROM 19 though a switch 21 whose position is controlled by the CPU 6. The first ROM 18 stores a first program for determining a combination of an aperture size and a shutter speed for main brightness measurement. The second ROM 19 stores a second program for determining a combination of an aperture size and a shutter speed for photographing images in relation to the subject brightness.

Figure 2:
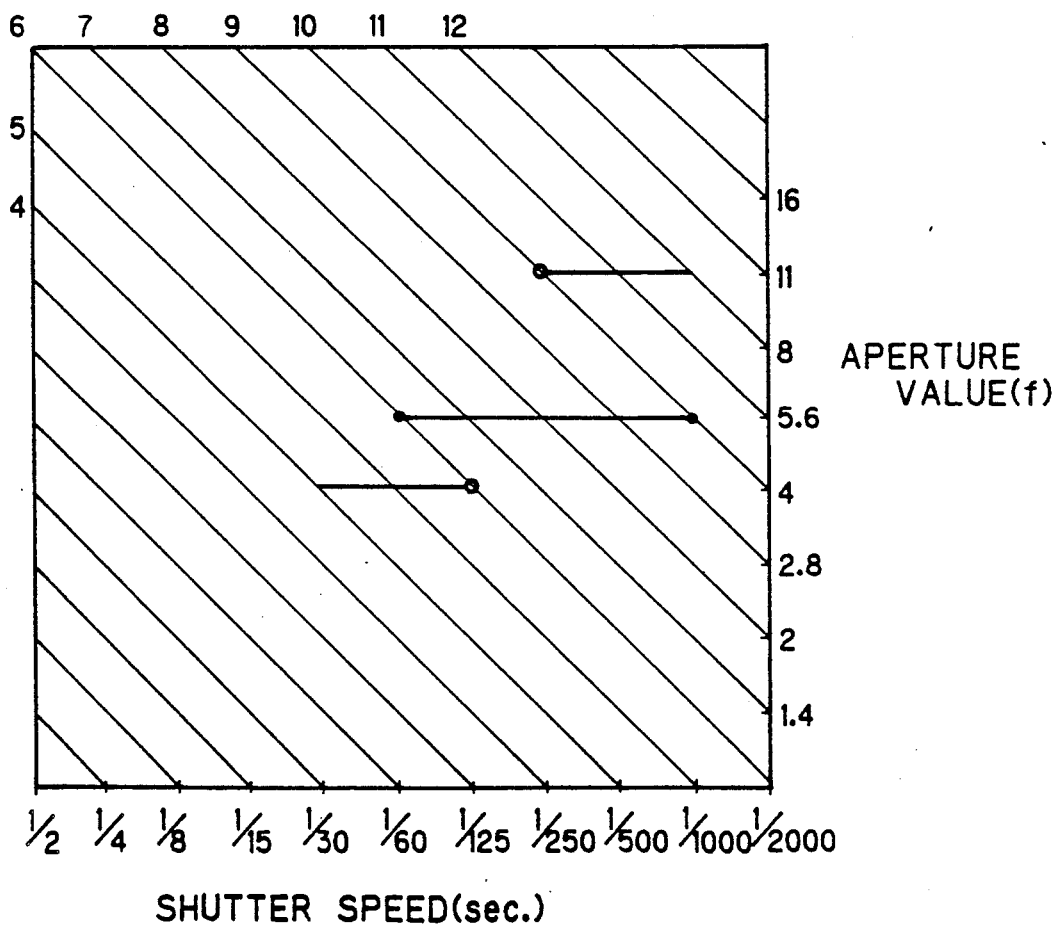
FIG. 2 is a diagram for explaining an exposure control program for brightness measurement.

According to the first program as shown in FIG. 2, for a subject brightness within a range from 6 to 10 BV (brightness value), the frequent and popular subject brightness range, only the shutter speed is changed in accordance with the subject brightness, while the aperture size is maintained at f5.6. To provide more detail, if the subject brightness value is under 6 BV, the aperture size is f4 and the shutter speed is under 1/125 sec. If the subject brightness is in a range from 6 to 10 BV, the aperture size is constantly f5.6, and the shutter speed is changed from 1/60 to 1/100 sec. Over 10 BV, the aperture size is f8 and the shutter speed is over 1/250 sec.

Figure 3:
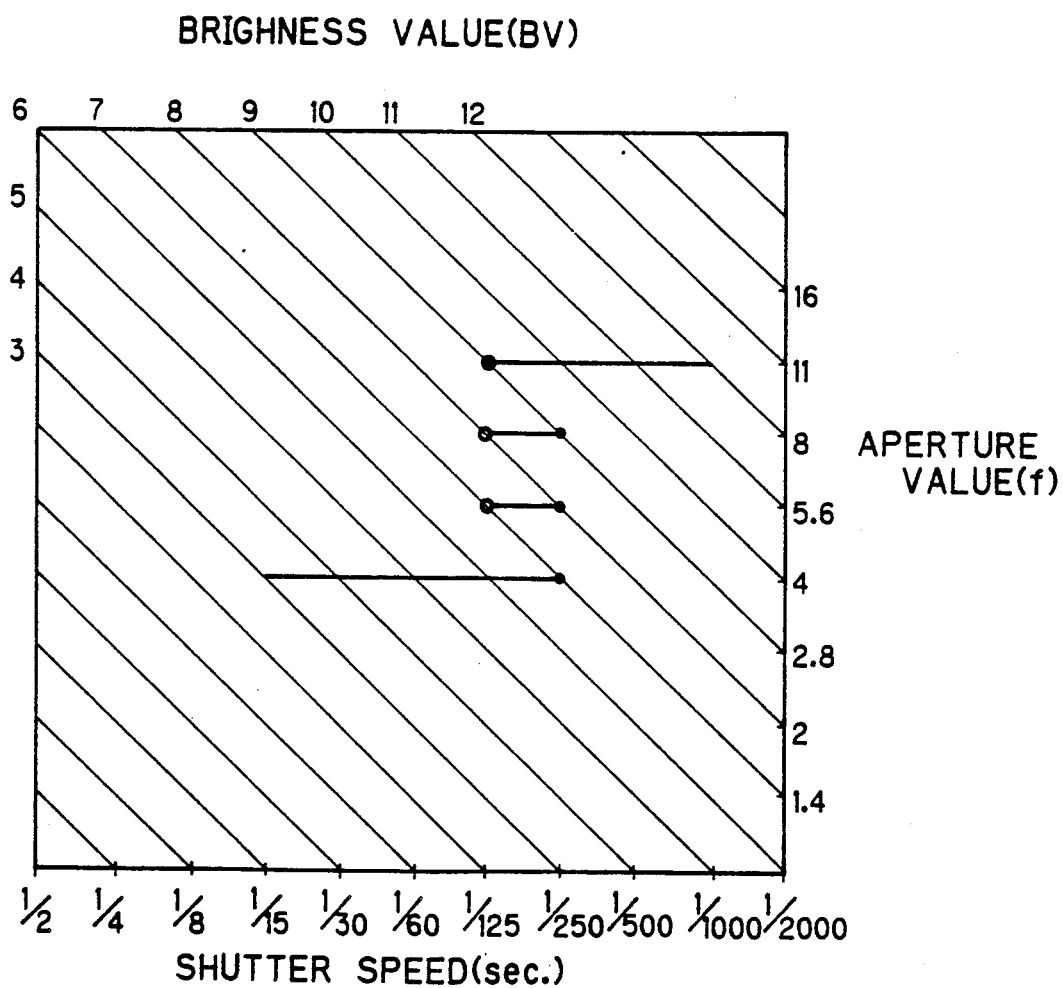
FIG. 3 is a diagram for explaining an exposure control program for photographing images.

On the other hand, according to the second program as shown in FIG. 3, for the popular subject brightness, the shutter speed is set in a range from 1/125 to 1/250 sec. To provide more detail, if the subject brightness value is 7 BV or under, the aperture is f5.6, and the shutter speed is 1/250 sec. or under. If the subject brightness is over 7 BV but is not more than 8 BV, the aperture is f5.6, and the shutter speed is over 1/125 but does not exceed 1/250 sec., whereas if the subject brightness is over 8 BV but is not more than 9 BV, the aperture is f8 and the shutter speed is over 1/125 but does not exceed 1/250 sec. Over 9 BV, the aperture is f11 and the shutter speed is over 1/125 sec. In this way, a combination of an aperture size and a shutter speed is determined.

It is to be noted that the above first and second programs are so defined that the brightness values at which the aperture size is to be changed according to the first program do not coincide with those defined in the second programs, in order to minimize the frequency of aperture size adjustment, because it takes a relatively long amount of time and thus increases the time lag to change the aperture size.

Next, the operation of the above electronic still camera 1 will be described with reference to the flow chart of FIG. 4 and the timing charts of FIG. 5.

Figure 4:
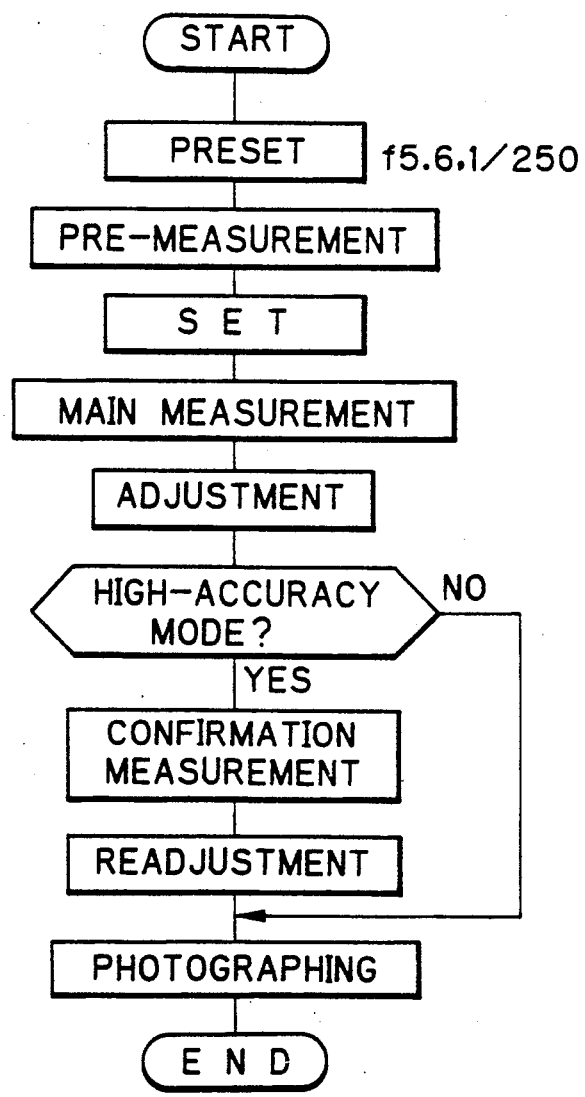
FIG. 4 is a flowchart for explaining essential parts of an exposure control sequence for the first embodiment of FIG. 1.
Figure 5:
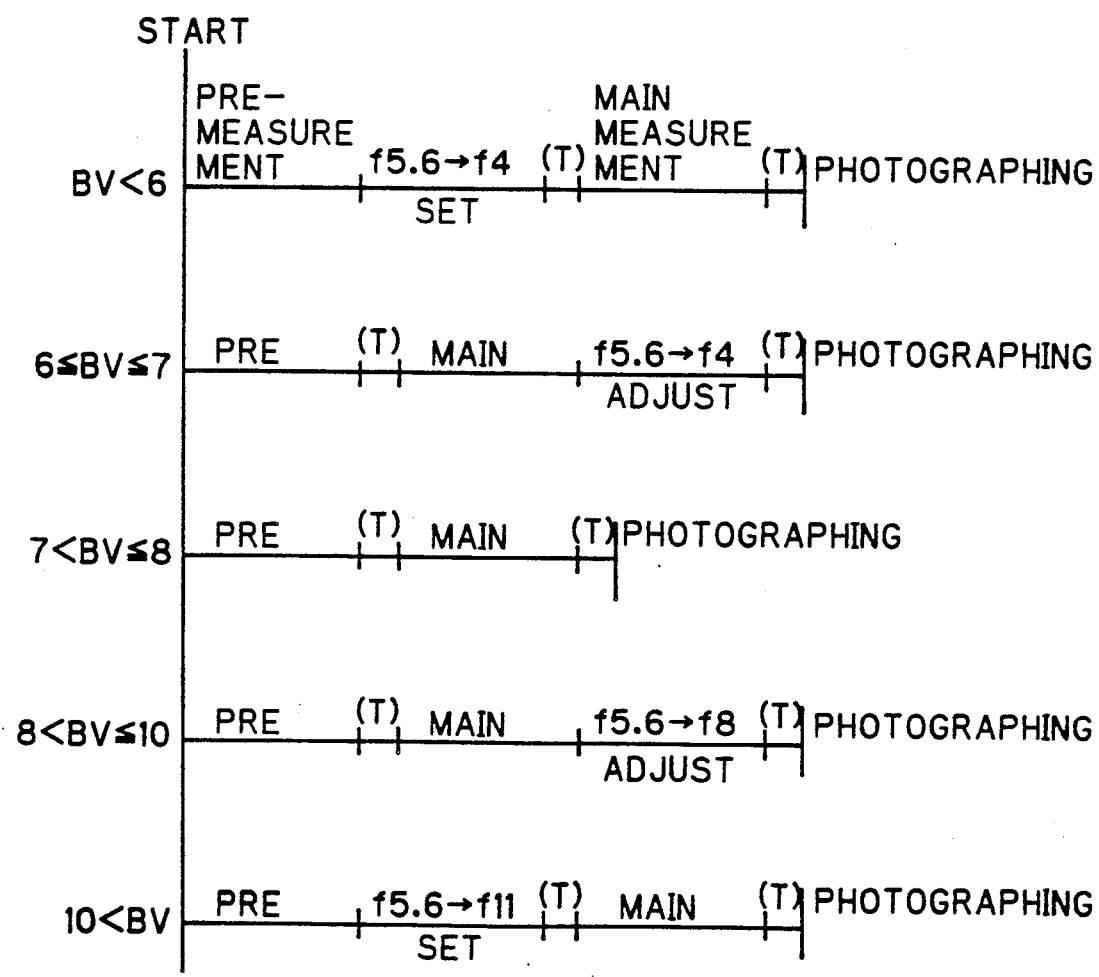
FIG. 5 shows timing charts for explaining the operation of the first embodiment.

Before the start of brightness measurement, the aperture disc 4 and the shutter speed are preset at the initial conditions, i.e. f5.6 and 1/250 sec., respectively, that is the best combination for the most frequent subject brightness value 8 BV ("PRESET" in FIG. 4). Under this condition, if the user wishes to control exposure at a high accuracy, he can select a high accuracy mode by turning a high accuracy mode switch (not shown) on, so that the exposure error may be retained within a range of ±0.1 EV, for instance. If such a high accuracy is not needed, that is, the exposure error of ±0.2 EV may be tolerated, the user does not actuate the high accuracy mode switch.

When a shutter is released while the taking lens 3 is directed to a subject to be photographed, the CPU 6 starts a pre-measurement process using the preset values of aperture and shutter speed, f5.6 and 1/250 sec., in accordance with a program sequence stored in the CPU 6. Thus, light passing through the taking lens 3 reaches the CCD 5 through the f5.6 aperture of the aperture disc 4. The CCD 5 stores charges corresponding to the incident light for the charge storage time of 1/250 sec., and sends thereafter the charges to the preamplifier 10 as analog signals, in response to pulses from the CCD driver 8. The analog signals are sampled and held at a certain sampling frequency, of which the luminance signal is sent to the clipper 16 through the A/D converter 15, so as to be subjected to the high and low luminance level clipping.

The clipped luminance signal is supplied to the CPU 6, which then calculates a subject brightness value based on the luminance signal and determines a combination of an aperture value and a shutter speed for brightness measurement according to the first program read out from the first ROM 18 ("SET" in FIG. 4). If, for example, the subject brightness value is 9 BV, then the shutter speed is changed to 1/500 sec., while the aperture value is unchanged at f5.6 according to the first program as shown in FIG. 2. When only the shutter speed is changed as above, the main measurement is started after a shutter speed changing time T from the end of the pre-measurement.

The main measurement is performed using the f5.6 aperture and the shutter speed 1/500 sec. in the same way as for the pre-measurement, but the CPU 6 again determines a combination of an aperture value and a shutter speed for imaging based on a subject brightness value detected by the main measurement, with reference to the second program read out from the second ROM 19. If, for example, the subject brightness value detected by the main measurement is still 9 BV, the aperture value and the shutter speed are changed to f8 and 1/250 sec., respectively, according to the second program as shown in FIG. 3 ("ADJUSTMENT" in FIG. 4). When, at that time, the user did not select the high accuracy mode, the CPU 6 drives the CCD 5 in this condition to effect the exposure, and completes the signal processing and recording. But when the high accuracy mode is selected, a confirmation measurement is executed before the exposure as is shown in FIG. 4.

In this confirmation measurement, the subject brightness is measured using the combination of an aperture value and a shutter speed determined on the basis of the main measurement, that is, f8 and 1/250 sec. in the present case. If the brightness value detected by the confirmation measurement differs from that detected by the main measurement, only the shutter speed is readjusted while the aperture value, f8, is kept unchanged ("READJUSTMENT" in FIG. 4). Because the aperture value is not changed, for which a relatively long time is needed, and the shutter speed can be adjusted in a very short time, the confirmation measurement and the readjustment will not so remarkably increase the time lag from the shutter release operation to the actual exposure, so that it becomes possible to control the exposure at a high accuracy as well as at a high speed.

It is to be noted that an averaged brightness measuring for detecting the averaged brightness of the overall photographing field is adopted as the brightness measurement though the CCD 5 in the above described embodiment. But another measuring system may be applicable, such as a divided brightness measuring for detecting the respective brightnesses of several sections in the photographing field or a center-weighted measuring where the priority is given to the brightness of the center area of the photographing field.

Next, a second embodiment of the invention will be described with reference to FIGS. 6 to 8, wherein the luminance signal detected from the electric signal from the CCD 5 are amplified at a different gain between on the pre-measurement and on the main measurement in an electronic still camera 30.

Figure 6:
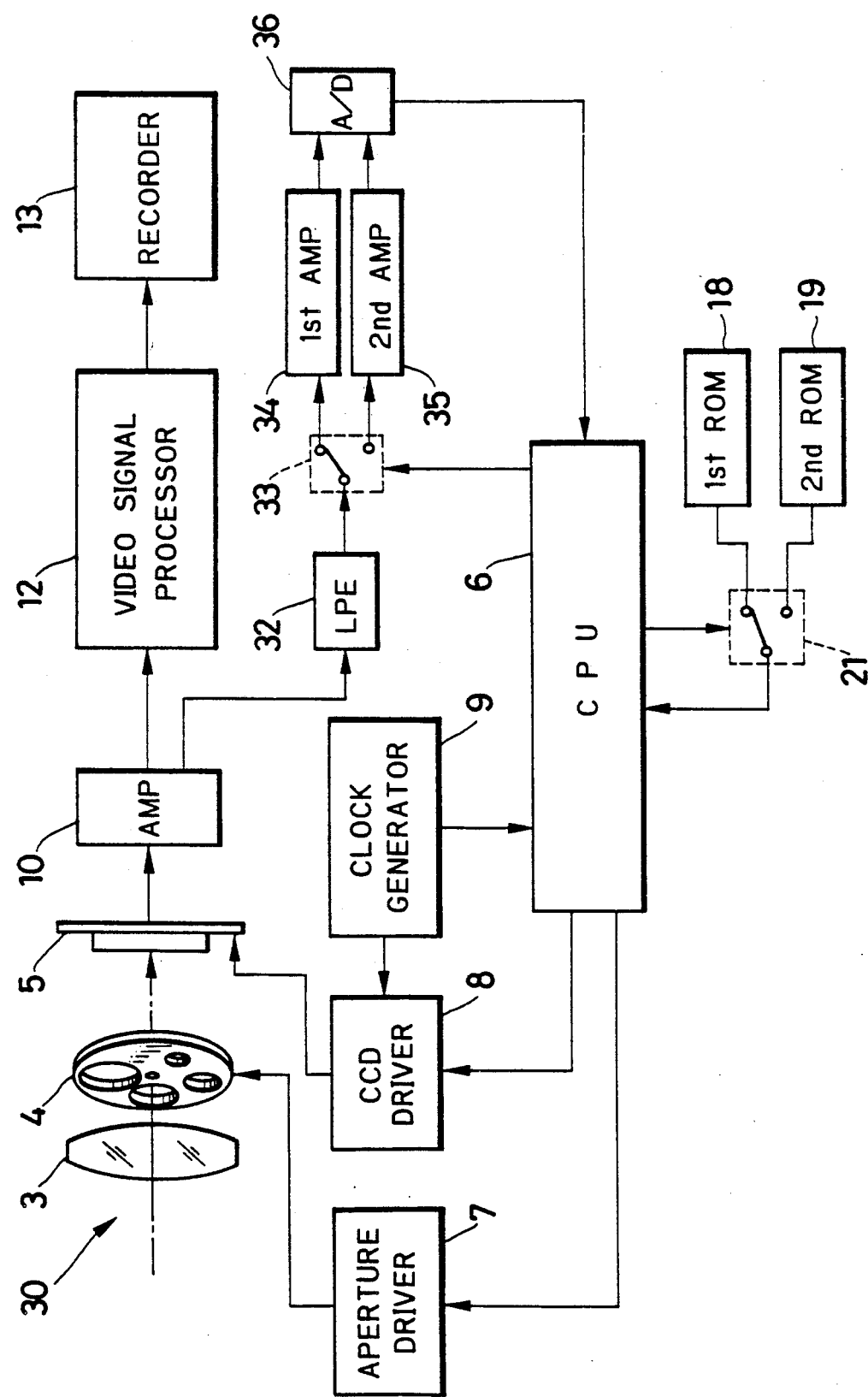
FIG. 6 is a block diagram of an automatic exposure control apparatus for an electronic still camera according to a second embodiment of the invention.
Figure 7:
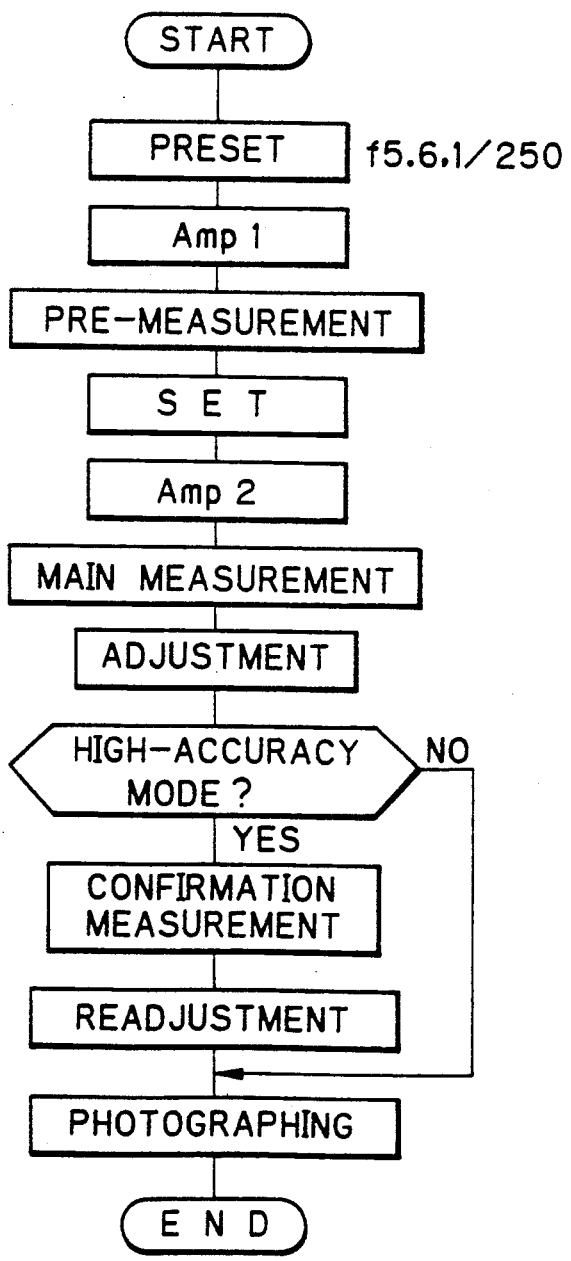
FIG. 7 is a flowchart for explaining essential parts of an exposure control sequence for the second embodiment of FIG. 6.

As shown in FIG. 6, the luminance signal sampled and held in the amplifier 10 is, after passing though a low pass filter (LPF) 32, supplied to a first amplifier 34 in the premeasurement, or to a second amplifier 35 in the main measurement, respectively though a changeover switch 33. The amplified luminance signal is sent to the CPU 6 through an A/D converter 36.

Figure 8:
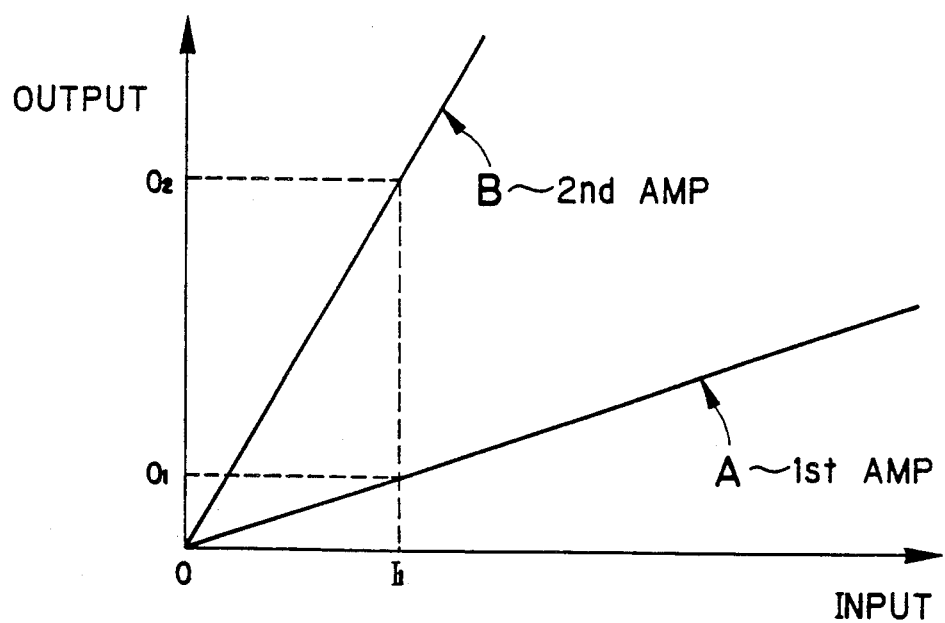
FIG. 8 is a diagram showing characteristic curves of two amplifiers used in the second embodiment.

The characteristics of the first amplifier 34 and of the second amplifier 35 are shown respectively by curves A and B in FIG. 8. As apparent therefrom, the first amplifier 34 outputs a voltage $O_1$ in response to an input luminance signal $I_1$, whereas the second amplifier 35 outputs a voltage $O_2$ in response to the same signal $I_1$, wherein $O_1$ is smaller than $O_2$. That is, the gain $G_1$ of the first amplifier 34 is smaller than the gain $G_2$ of the second amplifier 35; for example, $G_2 = 5G_1$. In other words, the first amplifier 34 is smaller in gain but is larger in dynamic range than the second amplifier 35.

Accordingly, a broader range of subject brightness is covered by the pre-measurement using the first amplifier, and a combination of an aperture value and a shutter speed for the main measurement is determined based on a subject brightness data detected by the pre-measurement in accordance with the first program stored in the first ROM 18. The luminance signal detected by the main measurement using the determined values is amplified by the second amplifier 35 at the higher gain, so that the resolution on digitizing the luminance signal in the A/D converter is improved. As a result, the accuracy the accuracy of digital operation in the CPU 6 is improved. In this way, by using the first and second amplifiers having different gains respectively for the pre-measurement and for the main measurement, it becomes possible to control exposure at a high accuracy in a broad dynamic range.

As described so far, according to the automatic exposure control method for an electronic still camera of the present embodiment, a pre-measurement of the subject brightness is performed with a preset aperture value and a preset shutter speed, and a main measurement is performed with a combination of an aperture value and a shutter speed that are determined based on the result of the pre-measurement in accordance with a program for the main measurement, wherein the aperture value is selected from among a relatively small number of predetermined aperture values. Thereafter, a combination of an aperture value and a shutter speed for imaging is determined based on the result of the main measurement in accordance with another program, wherein the aperture value is selected from among a larger number of predetermined aperture values. Therefore, a highly accurate exposure control is achieved despite the number of change of the aperture is remarkably reduced, especially for a standard photographing. As a result, an electronic still camera having a small time lag is provided which is superior for catching a shutter chance.

According to a preferred embodiment of the invention, two amplifiers having different gains are provided for amplifying the output signal from a solid state imaging device at a lower amplification rate in the pre-measurement than in the main measurement. Accordingly, the detectable brightness range is broadened while achieving an accurate measurement.

While the invention has been described in detail above with reference to a preferred embodiment, various modifications within the scope and spirit of the invention will be apparent to people of wording skill in this technological field. Thus, the invention should be considered as limited only by the scope of the appended claims. For example, though shutter speed is adjusted by changing the charge storage time of the CCD, it may be possible to dispose a conventional shutter mechanism in front of the CCD so as to control the shutter speed of this mechanical shutter instead. In this case, the charge storage time of the CCD can be made constant.

What is claimed is:

1. An automatic exposure control apparatus for an electronic still camera comprising:
   a solid state imaging device disposed in an image plane of a taking lens for converting an optical image into an electric signal, said solid state imaging device being used for subject brightness measurement as well as for photographing;
   aperture stop means disposed in front of said solid state imaging device for adjusting the size of aperture through which light from the taking lens travels toward said solid state imaging device; and
   memory means which stores a first program for selecting a first combination of an aperture value and a shutter speed for a main measurement from among a first group of aperture values and shutter speeds on the basis of a brightness value detected by a preliminary measurement that is performed with a predetermined combination of an aperture value and a shutter speed, and a second program for selecting a second combination of an aperture value and a shutter speed for photographing from among a second group of aperture values and shutter speeds on the basis of a brightness value detected by said main measurement, said second group having a larger variation in aperture value than said first group.

2. An automatic exposure control apparatus as defined in claim 1, wherein said shutter speed corresponds to the charge storage time of said solid state imaging device during which an optical image is converted into and stored as signal charges in said solid state imaging device.

3. An automatic exposure control apparatus as defined in claim 2, wherein said memory means further stores a third program for executing a confirmation measurement with said selected combination of an aperture value and a shutter speed for photographing and, if necessary, correcting said shutter speed according to the result of said confirmation measurement before photographing.

4. An automatic exposure control apparatus as defined in claim 2, further comprising:
   first and second amplifiers for amplifying an output signal from said solid state imaging device, said first amplifier having a smaller gain than said second amplifier; and
   switching means for connecting said output signal to said first amplifier during said preliminary measurement and connecting said output signal to said second amplifier during said main measurement.

5. An exposure control apparatus as defined in claim 4, wherein said second amplifier has a gain five times as large as that of said first amplifier.

6. An exposure control apparatus as defined in claim 4, further comprising a low-pass filter connected to the output of said solid state imaging device.

7. An exposure control apparatus as defined in claim 2, wherein brightness values at which the aperture value is to be changed according to said first program are different from those according to said second program.

8. An exposure control apparatus as defined in claim 2, wherein said aperture stop means is a rotatable aperture disc having a number of apertures of different sizes arranged around its rotary axis.

9. An exposure control apparatus as defined in claim 2, further comprising means for clipping the high and low luminance components of said output signal from said solid state imaging device.

10. An automatic exposure control method for an electronic still camera in which a solid state imaging device is disposed in an image plane of a taking lens for converting an optical image of a subject into an electric signal and is used to measure the brightness of said subject as well as to pick up said image as an image signal, said method comprising the steps of:
    measuring a brightness value of said subject with a fixed combination of an aperture value and a shutter speed;
    selecting a first combination of an aperture value and a shutter speed based on the subject brightness value detected by the measurement with said fixed values, said first combination being selected from among a first group of aperture values and shutter speeds having a smaller variation in aperture values;
    measuring a brightness value of said subject with said first combination of an aperture value and a shutter speed;
    selecting a second combination of an aperture value and a shutter speed based on the subject brightness value detected by the measurement with said first combination, said second combination being selected from among a second group of aperture values and shutter speeds having a larger variation in aperture values;
    photographing said subject with said second combination of said aperture value and said shutter speed.

11. A method as defined in claim 10, wherein said shutter speed corresponds to the charge storage time of said solid state imaging device during which an optical image is converted into and stored as signal charges in said solid state imaging device.

12. A method as defined in claim 11, further comprising the steps of:
    measuring a brightness value of said subject with said second combination of an aperture value and a shutter speed before photographing; and
    adjusting said shutter speed to said latest brightness value while maintaining said aperture value unchanged.

13. A method as defined in claim 12, further comprising the steps of:
    amplifying said output signal from said solid state imaging device at a lower gain during the measurement with said fixed combination of an aperture value and a shutter speed; and
    amplifying said output signal to a higher gain during the measurement with said selected first combination of an aperture value and a shutter speed.

14. A method as defined in claim 13, wherein said fixed combination of an aperture value and a shutter speed are f5.6 and 1/250 sec.

15. A method as defined in claim 14, wherein an aperture value of f5.6 is selected for a subject brightness value in a range between 6 and 10 BV when selecting said first combination.

* * * * *